United States Patent
Preston et al.

(10) Patent No.: US 10,684,616 B2
(45) Date of Patent: Jun. 16, 2020

(54) SELF-TEST SYSTEM FOR QUALIFYING REFRIGERATION CHILLER SYSTEM PERFORMANCE

(71) Applicants: Philip Preston, Northfield, IL (US); Andrew Witt, Chicago, IL (US); John Atterberry, Chicago, IL (US)

(72) Inventors: Philip Preston, Northfield, IL (US); Andrew Witt, Chicago, IL (US); John Atterberry, Chicago, IL (US)

(73) Assignee: Preston Industries, Inc., Niles, IL (US)

( * ) Notice: Subject to any disclaimer, the term of this patent is extended or adjusted under 35 U.S.C. 154(b) by 0 days.

(21) Appl. No.: 15/417,983

(22) Filed: Jan. 27, 2017

(65) Prior Publication Data
US 2018/0217028 A1    Aug. 2, 2018

(51) Int. Cl.
| | |
|---|---|
| G05B 23/02 | (2006.01) |
| G05B 19/042 | (2006.01) |
| G01M 99/00 | (2011.01) |
| F25B 49/00 | (2006.01) |
| F25B 25/00 | (2006.01) |

(52) U.S. Cl.
CPC ........ *G05B 23/0245* (2013.01); *F25B 49/005* (2013.01); *G01M 99/002* (2013.01); *G01M 99/008* (2013.01); *G05B 19/042* (2013.01); *F25B 25/005* (2013.01); *F25B 2500/19* (2013.01); *F25B 2700/1933* (2013.01); *F25B 2700/21151* (2013.01); *F25B 2700/21152* (2013.01); *F25B 2700/21173* (2013.01)

(58) Field of Classification Search
CPC .. G01M 99/005; G05B 23/0245; F25B 49/00; F25B 2500/18; F25B 49/005; F25B 2500/19; F25B 2700/1933; F25B 2700/21151; F25B 2700/21152; F25B 2700/21173
See application file for complete search history.

(56) References Cited

U.S. PATENT DOCUMENTS

| | | | |
|---|---|---|---|
| 4,221,576 A | 9/1980 | Phillips, Jr. | |
| 4,616,485 A * | 10/1986 | Gillett | B60H 1/3225 165/11.1 |
| 5,083,438 A * | 1/1992 | McMullin | G01L 3/26 165/11.1 |
| 5,623,426 A * | 4/1997 | Ozawa | F25B 49/043 62/101 |
| 5,809,795 A | 9/1998 | Beaverson | |

(Continued)

FOREIGN PATENT DOCUMENTS

WO    WO-2008150816 A1 *  12/2008    .............. F24F 11/77

OTHER PUBLICATIONS

PCT International Search Report—dated Mar. 28, 2018.
PCT International Report on Patentability (Chapter 1 of the Patent Cooperation Treaty) dated Aug. 8, 2019.

*Primary Examiner* — Alexander Satanovsky
*Assistant Examiner* — Liam R Casey
(74) *Attorney, Agent, or Firm* — Vitale, Vickrey, Niro, Solon & Gasey LLP (57) ABSTRACT

A chiller or cooler is disclosed, including a self-test mechanism to simulate a sampling of normal operations and to compare the operating parameters resulting from such sampling against factory operational parameters adjusted for differences in operating parameters so as to eliminate unnecessary servicing or maintenance events.

5 Claims, 3 Drawing Sheets

(56) References Cited

U.S. PATENT DOCUMENTS

| | | | |
|---|---|---|---|
| 6,202,431 B1* | 3/2001 | Beaverson | F04D 27/0207 62/196.3 |
| 6,272,868 B1* | 8/2001 | Grabon | F25B 49/027 165/11.1 |
| 2002/0122022 A1* | 9/2002 | Tze | G09G 3/36 345/101 |
| 2002/0139131 A1* | 10/2002 | Meyer | F25B 49/022 62/156 |
| 2002/0173929 A1* | 11/2002 | Seigel | F24F 11/30 702/130 |
| 2003/0014985 A1* | 1/2003 | Dresens | B01D 8/00 62/149 |
| 2006/0042276 A1* | 3/2006 | Doll, Jr. | F25B 49/005 62/129 |
| 2011/0120162 A1* | 5/2011 | Ueda | F25B 1/053 62/228.1 |
| 2011/0153274 A1* | 6/2011 | Ho | F25B 49/005 702/182 |
| 2012/0022700 A1 | 1/2012 | Drees et al. | |
| 2013/0002446 A1* | 1/2013 | Smith | F25B 49/005 340/815.4 |
| 2015/0016949 A1* | 1/2015 | Smith | F01D 11/24 415/1 |
| 2015/0159893 A1* | 6/2015 | Daubman | G05B 15/02 700/278 |
| 2015/0241856 A1 | 8/2015 | Walser et al. | |
| 2015/0342177 A1 | 12/2015 | Hassanein et al. | |
| 2016/0131605 A1* | 5/2016 | Hamrouni | B60H 1/00014 702/183 |
| 2017/0211833 A1* | 7/2017 | Tran | F25B 49/022 |
| 2018/0195788 A1* | 7/2018 | Nolte | F25D 21/08 |

\* cited by examiner

Fig. 1

SELF-TEST SYSTEM FOR QUALIFYING REFRIGERATION CHILLER SYSTEM PERFORMANCE

FIELD OF THE DISCLOSURE

The present disclosure relates generally to an integrated self-test mechanism for the more accurate monitoring and diagnosis of the in situ efficacy of a chiller. More specifically, the present disclosure is directed towards a system and method for self-testing chiller components, such as a compressor, including comparing sample in situ operational characteristics against characteristics recorded at the time of manufacture that are adjusted to account for in situ operational parameters.

BACKGROUND OF THE INVENTION

Chillers and Coolers have developed as a proven technology over several decades in a variety of end-user and OEM applications ranging from lasers and analytical equipment to reactors and manufacturing equipment. Specifically, such devices provide stable and reliable cooling for many common heat removal applications, including laser etching, AA furnaces, ICP, rotary evaporators, vacuum systems, reaction vessels, plasma etching, and condenser cooling, among others.

One challenge, however, is the expenses attendant with the use of such equipment, coupled with the lack of task specific expertise needed for the efficient maintenance of such equipment. That is, while the customers of various chillers and coolers may be exceptionally talented scientists, technicians and engineers related to their applications, the end users may not be experts in the diagnosis and service of such equipment. Also, end users and even service personnel may not be aware of the nominal factory level operation parameters of the chiller or cooler being serviced so as to properly diagnose whether the equipment does in fact require servicing. Indeed, anecdotal results from the applicant indicate that as much as 25% or more of service requests for chillers are "false positives," i.e., not events that require service or replacement of such equipment.

Currently, there exists conventional diagnostic and service technician equipment in the marketplace for testing the efficacy of a chiller, cooler or the like. Unfortunately, such equipment is not integrated with the chiller or cooler. Moreover, such equipment usually requires a service technician that needs to go to the end user's location, or alternatively receives the chiller or cooler at a site remote from the end user for service or repair. Unfortunately, as human nature is more reactive to the care of such equipment, such diagnosis will frequently occur only after the malfunction or degradation in performance of the chiller or cooler. As a result, any servicing requires can require either chiller redundancy, which may not be economically feasible, or downtime creating economic upheaval for the end user. Moreover, the inability to handle service requirements prior to malfunction or degraded performance may impact the effective lifespan of the chiller or cooler, with resulting increases in capital expenditures for the end user. As a result, the chillers and coolers may need a greater ability to test and service such equipment than can be had through human supervision and monitoring of such equipment.

To date, there are no chiller or cooler products which provide an integrated self-test system that can prompt a manufacturer and/or user and indicate that servicing is required in advance of potential malfunction or degradation.

What is needed is a chiller or a cooler with an integrated self-test mechanism that prompts an end user to initiate servicing prior to potential operational problems with such equipment. Moreover, such equipment can involve a self-test mechanism that can be used by any end user, regardless of sophistication.

DEFINITION OF TERMS

The following terms are used in the claims of the patent as filed and are intended to have their broadest plain and ordinary meaning consistent with the requirements of the law:

A chiller is a machine used within an industrial or laboratory applications that removes heat from a liquid via a vapor-compression or absorption refrigeration cycle.

"In situ operational parameters" means operating conditions (e.g., temperature, pressure) for the chiller at the location of operation, but disconnected from the external system being supported so as to provide a closed fluid loop of known mass for evaluation of diagnostics.

Factory settings or factory parameters refers to the diagnostics for the chiller at manufacture with known operational parameters so as to provide a baseline (datum) for comparing against diagnostics after accounting for differences between the operational parameters in situ versus such parameters as of the date of manufacture.

Where alternative meanings are possible, the broadest meaning is intended. All words used in the claims set forth below are intended to be used in the normal, customary usage of grammar and the English language.

SUMMARY OF THE INVENTION

The present invention relates to one or more of the following features, elements or combinations thereof.

One disclosed embodiment is directed to the use of a chiller that is configured to support a self-test mechanism to compare the operational parameters of the chiller against factory (new) performance levels. Specifically, at the time of manufacture, a series of tests are performed which accurately measures and stores certain performance criteria for the chiller, which may include, but are not limited to pull-up (heat up of fluid temperature), stability (fluid temperature holding accuracy), and pull-down (cool down of fluid temperature) parameters. This measurement data is stored in the chiller and remains with the chiller for its lifetime, as a signature of its performance.

Upon the user initiating a self-test operation (e.g., pressing a "self-test" button), the chiller instructs itself to follow certain preprogrammed temperature set points autonomously. The chiller is reconfigured (by fluid hose lines so as to connect the inlet and outlet ports to one another directly) by end user to perform an automatic self-test characterization of the users Chiller at install locale/operation site. By connecting the inlet to the outlet, (i.e., fluid supply and return lines) connection points at the instrument, chiller then instructed to automatically operate a specific sequence of system operations. Measurements from such system operations are internally derived to the chiller and compared to the signature of measurements recorded at the time of manufacture, while altering or adjusting such manufacturing measurements to account for differences from in situ operating parameters (e.g., differences between the operational ambient air temperature and the temperature as of manufacture). Differences between these two groups of measurements (e.g., differences between the adjusted manufacturing measurement and the in situ measurements beyond a predefined threshold) are used to determine chiller degradation and/or predict the need for servicing. As a result of these comparisons, the self-test mechanism presents to the user and/or the manufacturer a performance indication and/or indication that corrective action is required.

Thus, it can be seen that one object of the disclosed invention is to provide a chiller with an integrated self-test mechanism enabling the effective testing of current operational parameters as compared to new or factory parameters.

A further object of the present invention is to provide a chiller assembly with the ability to reduce or eliminate unnecessary downtime and/or repair events by eliminating "false positive" reports on chiller operations.

Still another object of the present invention is to provide a chiller with a self-test mechanism that is automated and does not require a service technician inspection, (with familiarity of refrigeration systems).

Yet another object of the present invention is to provide a chiller with a self-test mechanism that does not require disassembly or removal from its in situ location in order to determine whether the chiller is operating within normal parameters (not exhibiting a diminished capacity with respect to catalog specifications as of the time of manufacture).

It should be noted that not every embodiment of the claimed invention will accomplish each of the objects of the invention set forth above. For instance, certain claimed embodiments of the invention may focus only upon pull down and set point maintenance functions. In addition, further objects of the invention will become apparent based upon the summary of the invention, the detailed description of preferred embodiments, and as illustrated in the accompanying drawings. Such objects, features, and advantages of the present invention will become more apparent in light of the following detailed description of various preferred embodiments thereof, and as illustrated in the accompanying drawings.

DETAILED DESCRIPTION OF EMBODIMENTS OF THE INVENTION

Figure 1:
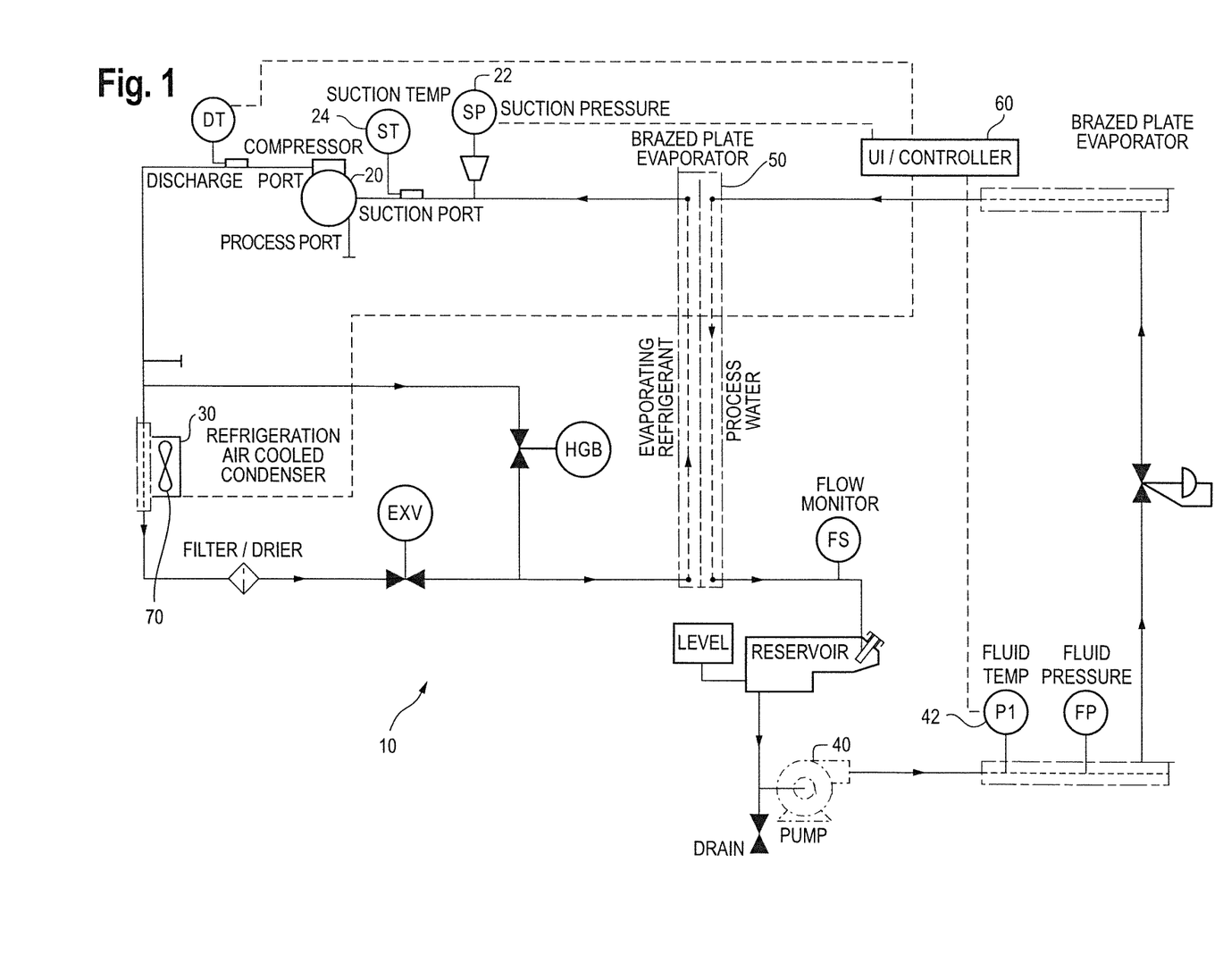
FIG. 1 mechanical schematic a chiller in accord with the first preferred embodiment.

As can be seen in FIG. 1, the present invention comprises chiller assembly 10 for supplying temperature regulation to an instrument or equipment (not shown). The chiller 10 includes the basic components of a compressor 20, a condenser 30 a pump 40, an evaporator 50, and a fan 70. The chiller further includes a controller unit 60 which receives inputs from various sensors related to each of these components. In this embodiment, the sensors include a suction pressure transducer 22, and a suction temperature sensor 24 for measuring the input to the compressor 20, as well as a fluid temperature sensor (P1) 42 downstream from pump 40.

At time of manufacture, a series of tests are performed which accurately measures and stores certain performance criteria for the chiller. (These readings taken are called pull-up, stability, pull-down parameters, and are all in units of time and temperatures). This measurement data is stored in the chiller and remains with the chiller for its lifetime stored within controller unit 60, as a signature of its performance.

Figure 2:
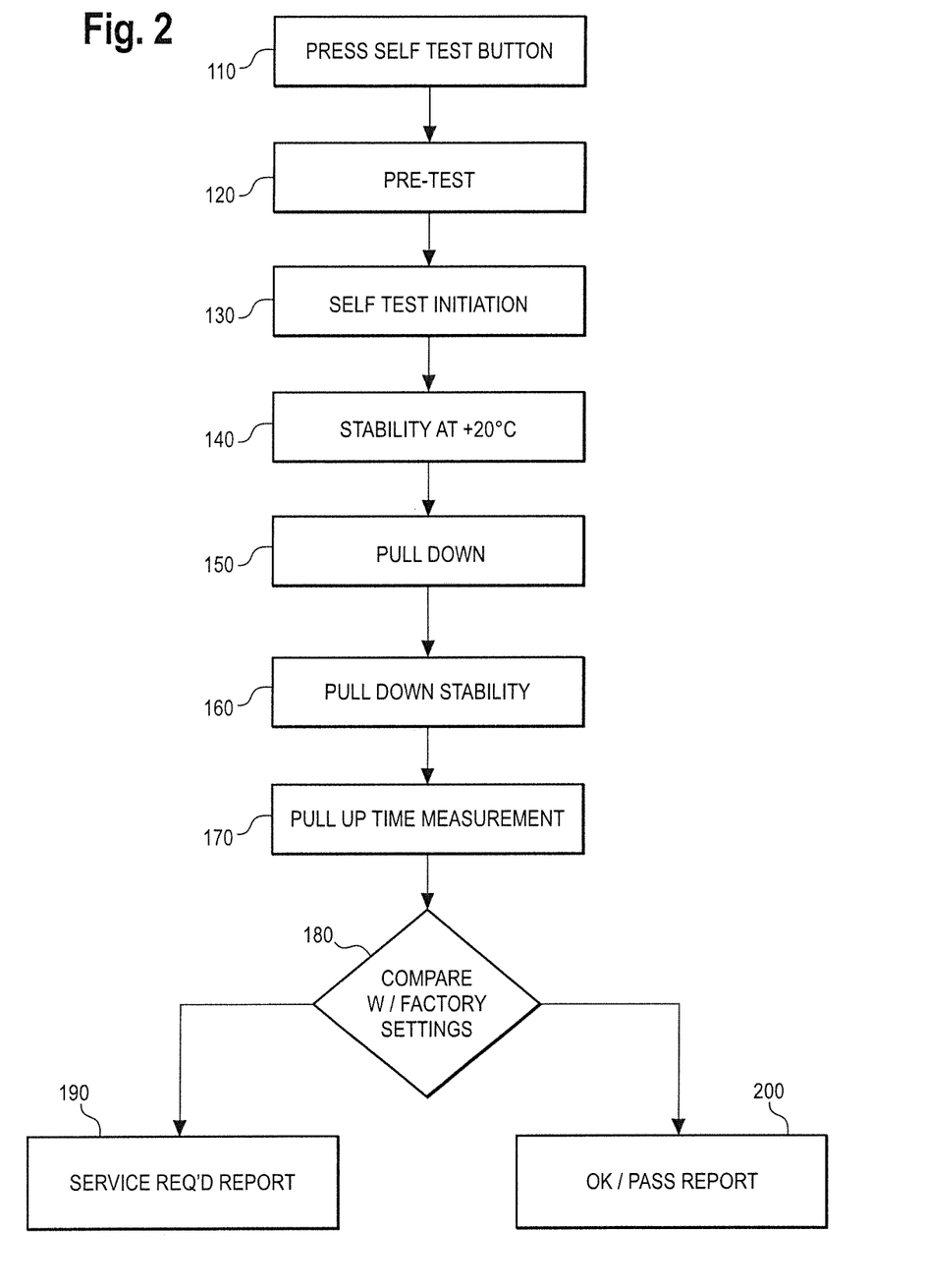
FIG. 2 is a flow diagram of the self-test process of the chiller as shown in FIG. 1.

An example of the self-test process 100 in accord with the embodiment shown in FIG. 1 is shown in the flow chart of FIG. 2. First is the step 110 of the system 10 receiving an input from a user initiating a self-test sequence. This step can be initiated by a button or a soft key (not shown) which is connected to the controller unit. As an additional option, the controller unit 60 can prompt the user to remind him of the need to initiate the self-test, e.g., prompting or querying the end user at regular time intervals. Once the end user initiates the self-test the chiller system 10 instructs itself to follow the following temperature set points (autonomously).

In a pre-test step 120, the controller unit 60 turns compressor 20 off, turns the pump 40 off and turns the fan 70 on. Then, once the discharge temperature sensor 26 reading is stable, e.g., +/−0.1 C for longer than 60 seconds, the controller unit 60 records the reading from that sensor, which represents the ambient air temperature environment where the chiller 10 is located.

The next self-test initiation step 130 is simply to enable the chiller 10 to operate as normal, under control of the controller unit 60 under an autonomous chiller set point in order to begin the sequencing of operational tests.

The next step 140 initiated by the controller unit 60 is a "stability at +20° C. measurement." This step, solely for purposes of this preferred embodiment, involves the controller unit 60 increasing the set point to 20° C. from its current level, waiting for the fluid temperature sensor (P1) 42 to achieve that set point, and to wait five minutes at that set point. The controller unit 60 measures temperature stability of the fluid temperature sensor (P1) 42 over this time period. Stability, for purposes of this embodiment, is fluid temperature degrees Celsius spread, where spread equals (maximum fluid temperature−minimum fluid temperature)/2, where the maximum and minimum temperatures derived over the five minute set point.

The next step 150 is a "pull down" measures the efficiency of changing (decreasing) temperatures. This step involves the controller unit 60 decreasing the set point to +10° C., i.e., 10 degrees below the point of step 140, and waiting for the fluid temperature sensor (P1) 42 to achieve that set point, and measuring the time required to achieve that set point.

The next step 160 is a "pull down stability" measurement which involves waiting for five minutes at the +10° C. of step 150, above, and having the controller unit 60 measuring temperature stability over this time period.

The next step 170 is a "time for pull-up measurement" which involves going back from the +10° C. to a +20° C. set put, wherein the controller unit 60 measuring the amount of time required for the fluid temperature sensor (P1) 42 to achieve that set point.

Next, the process 100 includes a analysis step 180 involving comparing each of the time and stability readings of steps 140, 150, 160 and 170 against the results stored in the controller unit 60 from the same tests recorded at the time of manufacture for the chiller 10, with such results being adjusted to account for differences between the operating parameters as of the date of manufacture. That is, this step by the processor first adjusts time and stability readings from the date of manufacture to account for differences in operating parameters (e.g., changes in ambient air temperature or pressures).

Figure 3:
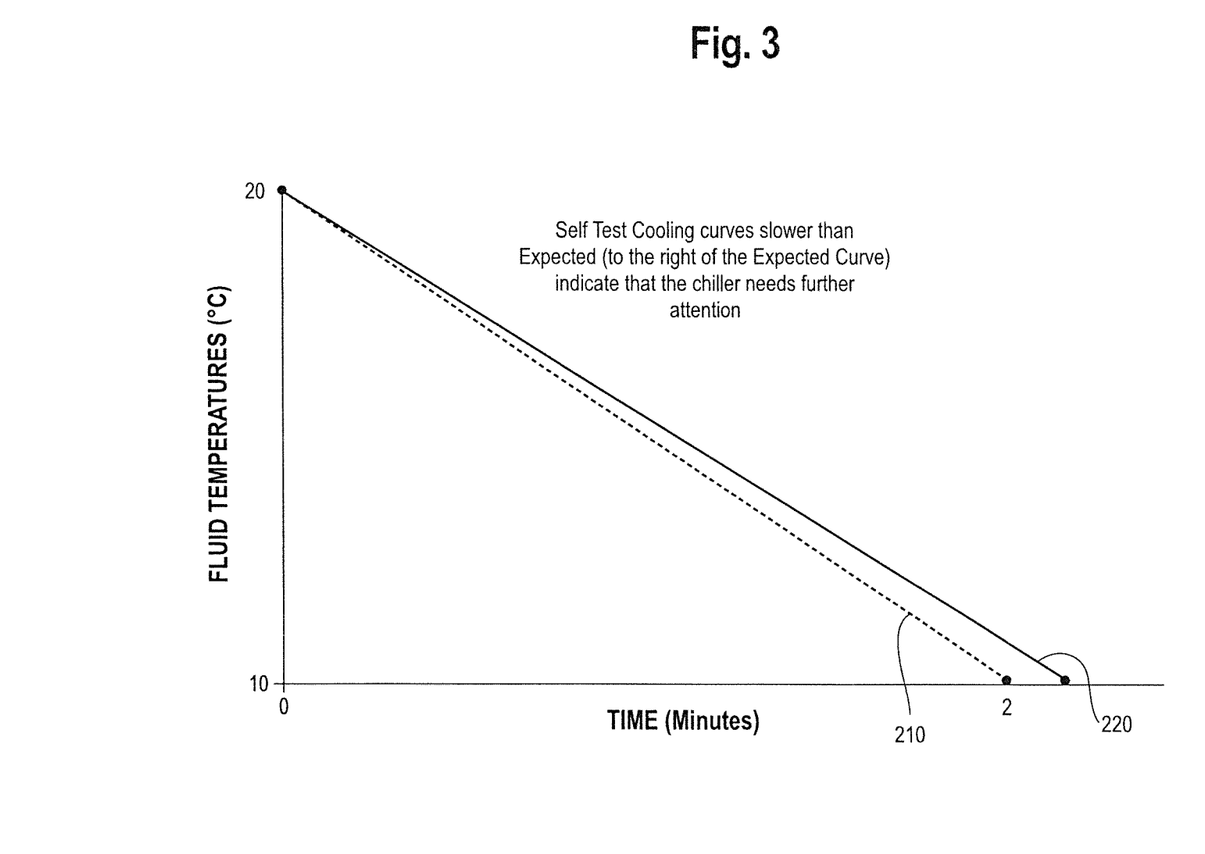
FIG. 3 is a diagram showing a prophetic example of the comparison of adjusted factory operating characteristics in comparison with the in situ operating characteristics being analyzed.

An example of how the differences between the adjusted factory readings and the in situ readings may be used in accord with the present invention is shown in FIG. 3. In this prophetic example, pull down function of the chiller system 10 as of the date of manufacture is determined. The processor 60 uses the discharge temperature sensor to account for degradation in the performance of the chiller that is due to, for instance, a higher pressure or ambient air temperature than the conditions in recording of the factory readings. Additional sensor readings, such as suction pressure transducer 22 and/or suction temperature sensor 24 can optionally be logged during the self-test for separate diagnostic use by technicians, but are unnecessary for use in the self-test as separate pass/fail criteria.

The resulting adjusted factory pull down reading is shown in figure element 210. The comparison in this example is then made between the adjusted expected factory pull down reading 210 and an in situ pull down reading 220 (corresponding to step 150). The slope deviation between the readings is the measure for warning in pull up or pull down. For instance a slope deviation of less than 10% in this example would be considered a "pass" or OK reading, while a deviation of between 10-20% would be a "yellow" or caution reading, and a slope deviation of greater than 20% would trigger a "service required" prompt as per step 200, below. In this preferred example, slope deviation as calculated by processor 60 would be used for pull up and pull down comparisons, while absolute deviation could be used as the measure for warning in temperature set point maintenance.

An example of this prophetic calculation of the effects of ambient temperature on chiller performance follows. In this preferred example, by using AHRI methods for calculating refrigeration compressor performance and making certain assumptions to simplify calculations, the operation of the present invention can calculate that chiller cooling capacity may be de-rated by 1.3% per ° C. rise in ambient temperature. This calculation for purposes of this example makes a number of assumptions, namely:

1. The calculation is directed to effects of rising ambient temperature on cooling capacity at fixed chiller leaving water temperatures (set point temperature);
2. Parasitic heat gains (e.g., heat absorption from hoses) presented to the chiller will rise with ambient temperature. The increased heat load will be offset to some extent by other effects, noted in Assumptions #3 and #4;
3. As compressor cooling capacity is diminished by rising ambient temperature, the refrigerant evaporator becomes effectively oversized with respect to compressor cooling capacity;
4. As compressor cooling capacity is diminished by rising ambient temperature, refrigerant condenser becomes effectively oversized with respect to compressor cooling capacity;
5. For purposes of this prophetic example, one can assume that the effects described in Assumption #2 will be offset to some degree by the effects described in Assumptions #3 and #4;
6. Based on Assumption #5, suction dew point temperature (aka saturated suction) is assumed to be fixed with respect to leaving water temperature; and
7. Based on Assumption #5, discharge dew point temperature (aka saturated discharge) is assumed to operate at a fixed differential from the ambient temperature (i.e. a 1° F. rise in ambient temperature results in a 1° F. rise in discharge dew point).

With these assumptions in place for this prophetic example, one can estimate compressor performance using established AHRI equations, so along as regression coefficients known and supplied by the compressor manufacturer are available, along with suction dew point and discharge dew point temperatures. An example of such an equation to establish instantaneous efficiency is set forth below:

Section 5. Rating Requirement 5.1 Published Ratings. The published Rating of the Compressor shall consist of the following individual ratings which are established through coefficients provided by the manufacturer that are to be used in Equation 1and tested as specified in Section 4 meeting the uncertainty in Section 5.4.
5.1.1 Power Input, W, W
5.1.2 Refrigerant Mass Flow Rate, lbm/h, kg/s
5.1.3 Refrigerating Capacity, Btu/h, W
5.2 Polynomial Equation. The polynomial equation that shall be used to present the
Published Ratings is a third degree equation of ten coefficients in the form of:

$$X = C_1 + C_2*(t_S) + C_3*t_D + C_4*(t_S^2) + C_5*(t_S*t_D) + C_6*(t_D^2) + C_7*(t_S^3) + C_8*(t_D*t_S^2) + C_9*(t_S*t_D^2) + C_{10}*(t_D^3)$$

Where
$C_1$ through $C_{10}$=Regression coefficients provided by the manufacturer
$t_D$=Discharge dew point temperature, ° F., ° C.
$t_S$=Suction dew point temperature, ° F., ° C.
X=Individual Published Ratings shown in Sections 5.1
(Source: AHRI Standard 540 from the 2015 Standard for Performance Rating Of Positive Displacement Refrigerant Compressors and Compressor Units)

In this prophetic example, one can generate coefficients for a representative compressor as specified by the AHRI and set forth below, though of course such coefficients will vary based upon the manufacturer:

| COEFFICIENT | CAPACITY |
| --- | --- |
| C1 | 7801.696 |
| C2 | 93.15076 |
| C3 | −42.714 |
| C4 | 1.264949 |
| C5 | 0.4885953 |
| C6 | −0.1130572 |
| C7 | 0.006240552 |
| C8 | −0.006111 |
| C9 | −0.00450243 |
| C10 | 9.26E−04 |

Using these stated assumptions and AHRI compressor capacity calculation methodology, one can calculate compressor cooling capacities across a range of ambient temperatures. Based on stated assumptions, an arbitrary value of 40° F. was chosen for the suction dew point, as this is well within normal operating parameters. A discharge dew point temperature of 100° F. was chosen to represent a nominal ambient condition, and this is shown to rise by the same increments as the ambient temperature, in accordance with stated assumptions.

The results of this calculation (shown below) provide a result whereby the compressor capacity can be stated as decreasing by 0.7% per ° F. ambient rise. This approximates a 1.3% performance reduction per ° C.

| Rise Above Nominal Ambient Temp ° F. | Suct Dewpoint t_s ° F. | Disch Dewpoint t_D ° F. | Cooling CAPACITY Btu/hr | % Capacity De-rate from Nominal | % Capacity De-rate per ° F. Rise Above Nominal Amb |
|---|---|---|---|---|---|
| Nominal | 40.00 | 100.00 | 8651.13 | At Nominal | At Nominal |
| 2.00 | 40.00 | 102.00 | 8523.51 | −1.5% | −0.7% |
| 4.00 | 40.00 | 104.00 | 8395.80 | −3.0% | −0.7% |
| 6.00 | 40.00 | 106.00 | 8268.07 | −4.4% | −0.7% |
| 8.00 | 40.00 | 108.00 | 8140.34 | −5.9% | −0.7% |
| 10.00 | 40.00 | 110.00 | 8012.67 | −7.4% | −0.7% |
| 12.00 | 40.00 | 112.00 | 7885.11 | −8.9% | −0.7% |
| 14.00 | 40.00 | 114.00 | 7757.68 | −10.3% | −0.7% |
| 16.00 | 40.00 | 116.00 | 7630.45 | −11.8% | −0.7% |
| 18.00 | 40.00 | 118.00 | 7503.45 | −13.3% | −0.7% |
| 20.00 | 40.00 | 120.00 | 7376.73 | −14.7% | −0.7% |
| 22.00 | 40.00 | 122.00 | 7250.33 | −16.2% | −0.7% |
| 24.00 | 40.00 | 124.00 | 7124.30 | −17.6% | −0.7% |

These results validate the capacity approximation used in a first simplified embodiment of the present invention whereby the expected reduction of capacity as a function discharge dew point temperatures can be determined. Thus, the present invention compares such expected changes in capacity at a first factory tested ambient condition adjusted for operating conditions and compares such results with in situ changes in capacity as a function of temperature. If the ratio of the slopes of expected capacity versus in situ capacity exceeds one or more predetermined values (e.g., 1.1 for "yellow conditions" or 1.2 for "red conditions") then the system can recommend dispositions, remedies or corrective actions to replace or maintain the safe operation of the system as required.

As shown by this prophetic example, if the temperature stability or pull up or pull down times obtained from the self-test process steps differ obtained from the stored factory parameters as adjusted for differences in operating parameters beyond a preselected limit (such as the deviation percentages set forth above), the controller unit 60 performs the step 190 of reporting a "service required" or "fail" indicator to the end user so that the chiller can be serviced promptly. In the alternative, if the self-test process step results are sufficiently similar to the stored factory parameters, then the controller unit 60 performs the step 200 of reporting a "pass" or "OK" signal. These service indicators are preferably reported to both the user and the manufacturer, though persons of skill having these teachings can understand that the notifications provided under the present invention may not necessitate automatic notices to all such parties. Additionally, these indicators can include, but do not have to include graphical results of the type shown in FIG. 3. Moreover, while the present invention does not require any automated maintenance in response to a service required indicator, one alternative embodiment of the present invention provides for the present service indicator to be linked to the self-cleaning filter invention taught in the application entitled "REFRIGERATION CHILLER SYSTEM WITH SELF-CLEANING FILTER" and owned by the assignees of the present invention. The teachings of that application are incorporated herein by reference, and provide an example of how the indicator of the present invention can be linked to an automated filter so as to further eliminate false maintenance indicators, e.g., instances in which the filter needs to be replaced, as opposed to performance degradation due to malfunction. Alternatively, another embodiment of the present invention can prompt a user to provide non-automated service support (e.g., changing filters or moving the location of the chiller to provide better airflow) so as to similarly eliminate unnecessary service events.

The differences between these two sets of data provide a confident determination of chiller performance and possible maintenance steps to investigate to maintain best chiller performance. The process thus allows the manufacturer and the user the ability to determine whether the chiller requires a return to factory for factory maintenance and repair/return or not. Thus, the Chiller Self-Test Procedure of the present disclosure may be used by various personnel to determine whether a chiller is operating within expected normal parameters, or else determine that the chiller is in need of further examination.

In other preferred embodiments, various preferred processes involving the application of the present invention are focused upon testing one of the more significant criteria for chiller operation, the Cooling Rate. The Cooling Rate is the rate at which energy, in the form of heat, can be removed from the chiller's process fluid. Cooling rate follows the form:

$$P = (m * C_P * \text{delta\_}T)/\text{time}$$

Where,
P: Cooling Rate (Power);
$C_P$: specific heat capacity of cooling fluid;
m: mass of cooling fluid;
delta_T: temperature change observed in cooling fluid; and
time: time interval of observation Two significant sources of variation exist that the present disclosure eliminates or normalizes in order to make a useful comparison between two observed cooling rates: 1) the thermal mass of cooling fluid; and 2) the normal change in cooling capacity due to differing ambient temperatures. Variable 1), thermal mass, is the product of the mass (m) and specific heat capacity ($C_P$) of the cooling fluid. It is controlled procedurally, by specifying that cooling rate tests, including Chiller Self Tests and production quality assurance testing as disclosed herein, must be conducted with a measured amount of a specified fluid such as a predefined mixture of water and glycol. This constrains both the mass and specific heat capacity of the fluid.

Variable 2), change in capacity due to varying ambient, is generally not feasible to control, so it may vary significantly between tests. In order to compensate for expected performance variations at different ambient temperatures, an ambient compensation factor is applied.

With the mass and specific heat of the cooling fluid constrained procedurally, the cooling rate of the chiller is thus proportional to the observed drop in temperature (delta_T) divided by the time over which this temperature drop is measured. Within the Self-Test Procedure, the measured cooling rate is specified in degrees Celsius per minute.

As part of end of line production quality assurance testing, a cooling rate is measured between two predefined fluid temperatures, using the same fluid type and amount that are specified for the particular chiller. The ambient temperature observed at the beginning of the test is also recorded. This measured cooling rate is known as the "Born on Performance," and may also be referred to as the "Reference Cooling Rate." The ambient temperature measured for this test is referred to as the "Reference Ambient Temperature." These recorded parameters are stored in the memory of the chiller controller 60 for use in future Chiller Self Tests.

Upon initialization of a Chiller Self-Test Procedure by a chiller user, the ambient temperature is recorded and stored in the memory of the chiller controller. This is referred to as the "Self-Test Ambient Temperature." The chiller controller will then compute and store in memory an "Ambient Temperature Compensation Factor" based off of the difference between Self-Test Ambient Temperature and Reference Ambient Temperature, multiplied by a coefficient equal to 1.3% per ° C. (or 0.013/° C.). This calculation of the Ambient Temperature Compensation Factor follows the form:

Ambient Temperature Compensation Factor=1+
((Reference Ambient Temperature)−(Self-Test Ambient Temperature))*0.013/° C.

Example Calculation

Reference Ambient Temperature=20° C.
Self-Test Ambient Temperature=22° C.
Ambient Temperature Compensation Factor=1+(20-22° C.)*0.013/° C.
Ambient Temperature Compensation Factor=0.974

During the Chiller Self-Test Procedure, the chiller controller multiplies the Ambient Temperature Compensation Factor by the Reference Cooling Rate, with the chiller controller registering the result in memory as the "Expected Cooling Rate." The calculation of Expected Cooling Rate follows the form:

Expected Cooling Rate=(Reference Cooling Rate)*
(Ambient Temperature Compensation Factor)

Example Calculation

Reference Cooling Rate=5° C./minute
Ambient Temperature Compensation Factor=0.974
Expected Cooling Rate=5° C./minute*0.974
Expected Cooling Rate=4.87° C./minute As part of the Chiller Self-Test Procedure, the chiller controller 60 will actuate components within the chiller such as motors and valves (such as the valves shown in FIG. 1) such that the chiller's cooling fluid will be cooled between the same two temperatures as used in the end of line production quality assurance test that was previously used to derive the Reference Cooling Rate and Reference Ambient Temperature. The cooling rate observed during the Chiller Self-Test will be registered in the memory of the chiller controller as the "Self-Test Cooling Rate."

Upon completion of the Chiller Self-Test Procedure's actuation of electromechanical circuits, the chiller controller 60 includes an interface (whether graphical, such as FIG. 3, and/or digital) that will provide the user with diagnostic information. The chiller controller will provide different diagnostic information depending on comparison of the Self-Test Cooling Rate and the Expected Cooling Rate. One or more thresholds below the Expected Cooling Rate may be established by the chiller controller, such that different actionable instructions will be presented to the user, based on the comparison between the Self-Test Cooling Rate and these threshold levels. A threshold level, will provide tolerance for variances in site and normal wear, such that false negative results are minimized. For instance, the chiller controller may instruct the user at the conclusion of the Chiller Self-Test that the chiller needs further service if the Self-Test Cooling Rate is less than 95% of the Expected Cooling Rate. Additional thresholds may be defined within the chiller controller, in order to instruct the user as to differing levels of problem severity.

While the disclosure is susceptible to various modifications and alternative forms, specific exemplary embodiments thereof have been shown by way of example in the drawings and have herein been described in detail. It should be understood, For instance, there is a number of variants in terms of which operational parameters can be sampled (e.g., discharge temperature, air flow volume, fan speed, etc.). Likewise, there is no special attachment to the particular order of tests in the self-test, or the composition of the tests employed (or the temperature quantities involved). Further, it will be understood that the present invention could encompass an adjustment of the in situ readings as opposed to the factory readings so as to enable the appropriate comparison of performance. There is no intent to limit the disclosure to the particular embodiments disclosed, but on the contrary, the intention is to cover all modifications, equivalents, and alternatives falling within the spirit and scope of the disclosure as defined by the appended claims.

What is claimed is:

1. A chiller including a compressor, a condenser, a pump, an evaporator and a fan, the chiller providing a fluid at a selectable set point of temperature, the chiller having an integrated self-testing system comprising:
   a) an air temperature sensor;
   b) a fluid temperature sensor;
   c) a controller, the controller generating in response to a user selection a first pretest signal for turning the fan on, the compressor off and the pump off, the controller connected to the air temperature sensor to measure the ambient air temperature resulting from the first pretest signal, the controller further generating a self test signal to the chiller to change the set point of temperature of the chiller a preselected amount, the controller further connected to the fluid temperature sensor to determine the self test cooling rate for the chiller to obtain the change in the set point, the controller further calculating an expected self test cooling rate using the ambient air temperature and a factory self test cooling rate stored in memory, and the controller further comparing the self test cooling rate and the expected self test cooling rate and generating a signal indicating whether the self test cooling rate and the expected self test cooling rate deviate by more than a preselected threshold;
   d) a memory connected to the controller, the memory including preloaded factory self test cooling rate in response to factory implemented self test signals; and
   e) an output interface connected to the controller for providing a signal indicating service requirement status in response to a controller input indicating that the self test cooling rate and the expected self test cooling rate deviate by more than a preselected threshold.

2. The chiller of claim 1, wherein the signal provided by the output interface includes a graphical comparison of the self test cooling rate adjusted by the ambient air temperature versus the factory self test cooling rate.

3. The chiller of claim 1, wherein the signal provided by the output interface includes at least one end user service recommendation.

4. The chiller of claim 3, wherein the at least one end user diagnostic recommendation includes an automated adjustment of in situ operational parameters.

5. A method for self testing the efficacy of a chiller in situ, the chiller including a compressor, a condenser, a pump, an evaporator, a fan, a temperature sensor, and a fluid sensor, the chiller providing a fluid at a selectable set point of temperature, the method comprising the steps of:
   a) storing a factory self-test cooling rate in a memory corresponding to the time required in factory to change the set point of temperature of the chiller a preselected amount;
   b) sending a first control signal turning the fan on, the pump off, and the compressor off to determine the ambient temperature of the chiller;
   c) sending a second control signal to the chiller to change the set point temperature a preselected amount and measure the time required to obtain the changed set point to determine the in situ self-test cooling rate;
   d) adjusting the factory self-test cooling rate using the ambient temperature of the chiller to derive an expected self-test cooling rate; and
   e) comparing the expected self-test cooling rate and the in situ factory self test cooling rate to provide a service requirement status output signal to a user when the in situ self test cooling rate and the expected self test cooling rate deviate by more than a preselected threshold.

* * * * *